US008298594B1

(12) United States Patent
Turner

(10) Patent No.: US 8,298,594 B1
(45) Date of Patent: Oct. 30, 2012

(54) DRY ANIMAL REPELLANT

(76) Inventor: John C. Turner, Maple Valley, WA (US)

( * ) Notice: Subject to any disclaimer, the term of this patent is extended or adjusted under 35 U.S.C. 154(b) by 4 days.

(21) Appl. No.: 11/385,492

(22) Filed: Mar. 21, 2006

Related U.S. Application Data

(63) Continuation-in-part of application No. 10/753,033, filed on Jan. 6, 2004, now abandoned.

(51) Int. Cl.
A61K 49/00 (2006.01)
A61K 36/81 (2006.01)

(52) U.S. Cl. ..................... 424/760; 424/10.31

(58) Field of Classification Search .......... None
See application file for complete search history.

(56) References Cited

U.S. PATENT DOCUMENTS

| | | | |
|---|---|---|---|
| 631,738 A | 8/1899 | Dowie et al. | |
| 4,462,505 A * | 7/1984 | Paradis | 220/266 |
| 4,795,637 A | 1/1989 | Harding, Jr. | 424/195.1 |
| 5,611,626 A * | 3/1997 | Warr | 383/10 |
| 5,674,496 A * | 10/1997 | Etscorn et al. | 424/760 |
| 5,756,100 A | 5/1998 | Martinez | 424/195.1 |
| 6,139,857 A * | 10/2000 | Gaddini | 424/405 |
| 6,264,969 B1 | 7/2001 | Poche | 424/410 |
| 2002/0076471 A1 * | 6/2002 | Olsson | 426/86 |
| 2003/0170180 A1 * | 9/2003 | Bahary | 424/10.4 |

OTHER PUBLICATIONS http://www.bloomingarden.com/cropculprits.html.*
http://www.bachmans.com/retail/tipsheets/bulbs_hardy/ProtectingBulbs fromCritters_print.cfm.*
Blood Meal http://www.extremelygreen.com/Product.cfm?Name=Blood%20Meal.*
Blood meal http://www.fao.org/Ag/AGA/AGAP/FRG/AFRIS/Data/317.HTM.*

* cited by examiner

Primary Examiner — Patricia A Leith
Assistant Examiner — Catheryne Chen
(74) Attorney, Agent, or Firm — Dean A. Craine

(57) ABSTRACT

A dry powdered animal repellent that does not harm animals or plants. The repellant uses dried and powdered blood meal mixed with chili powder and/or cayenne pepper. The repellant is mixed together in a large moisture resistant container and then sprinkled around or into the soil around plants or into a tunnel opening formed by a rodent. In the first embodiment, designed to repel dogs and cats, the composition contains a 60%/40% (w/w) mixture of blood meal and chili powder (with 10% or less moisture content) with the chili powder being made from peppers with a heat rating of at least 85,000 Scoville units or greater. In the second embodiment, the concentration of blood meal to chili powder is increased to 80%/20% (w/w) respectively, to promote greater plant growth and for greater absorption into worms or grubs living in the soil.

4 Claims, 1 Drawing Sheet

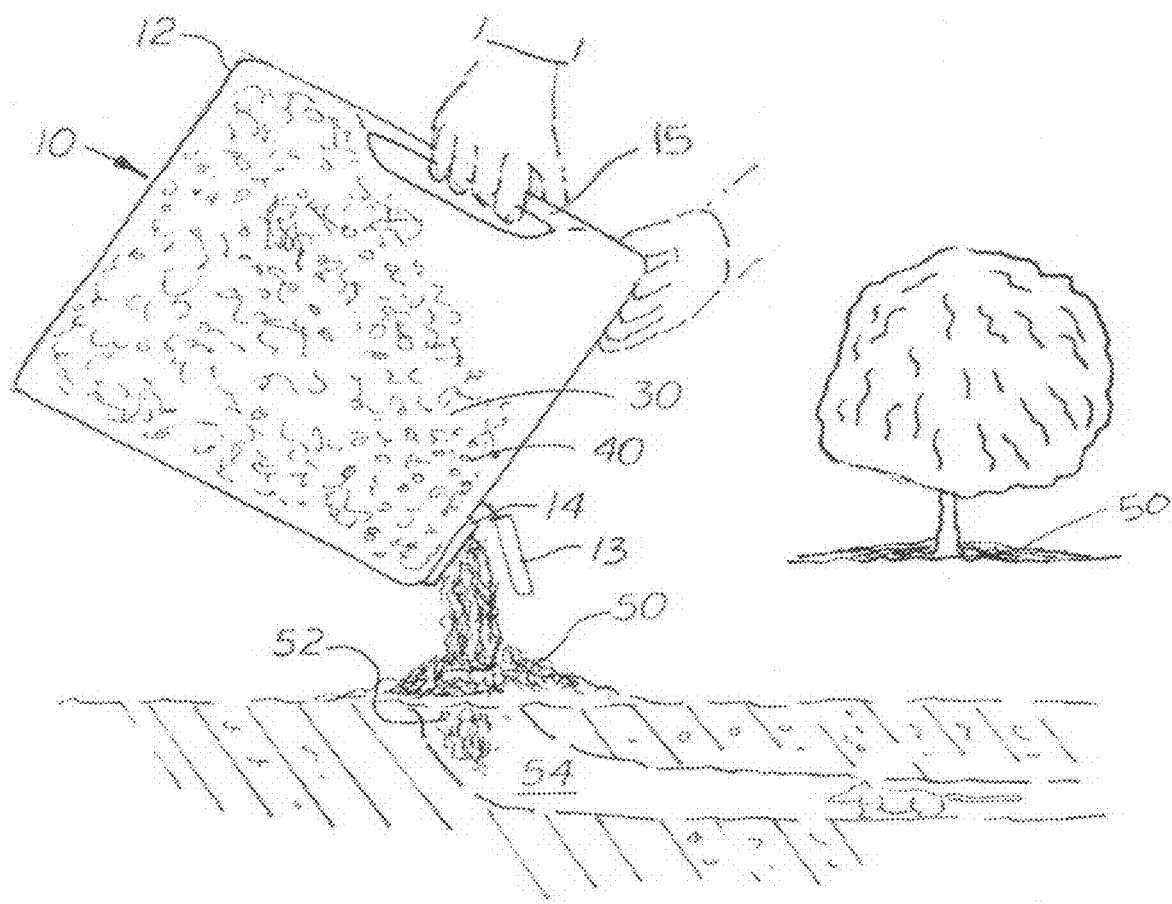

DRY ANIMAL REPELLANT

This is a continuation in part patent application based on the utility patent application (Ser. No. 10/753,033) filed on Jan. 6, 2004 now abandoned.

BACKGROUND OF THE INVENTION

1. Field of the Invention

This invention animal repellants, and more particularly, to animal repellents designed to be mixed into the soil.

2. Description of the Related Art

It is widely known that dogs and cats urinated outdoors on selected objects and plants. If the animal is allowed to urinate repeatedly at the same spot, the object and plant may be damaged or killed. A dry, premixed chemical that can be easily sprinkled around the object or plant that can be used safely with dogs and cats yet effectively repels the animal from urinating on a desired object or plant would be highly desirable.

Moles and gophers are notoriously known as rodents that form tunnels in the soil. Because mounds of dirt are generally regarded as hazards and distracting, many property owners seek various concoctions or methods to control or eradicate these rodents. Because the soil under the mound of dirt has been removed or disrupted, plants or grass located above the mound often turn brown or die.

While poisoned bait and rodent traps may be effect tools for eradicating these rodents, many people find them undesirable because of their potential to harm unintended targets such as children, dogs and cats. In order to be effective, the poisoned bait and trap must be properly placed in the tunnel or burrow so that it is not detected as a foreign obstacle. Unfortunately, even if the poisoned bait or trap is placed properly in the tunnel or burrow, small children, dogs and cats can dig from above into the tunnel and trap and disrupt the bait or trap. When the poisoned bait or trap is detected, the rodent avoids the bait and trap entirely.

What is needed is a fine or granular mole or gopher repellant that can be easily mixed with the soil that is safe to deter moles and gophers from burrowing in a desired area. What is also needed is a repellant to small children and other small animals, that will not harm them they contact the repellent. What is also needed is a repellent that when mixed with soil, actually promotes growth of damaged plants. What is also needed is a pre-mixed repellent that does not harden and less susceptible to mold growth and can easily dispensed by sprinkling into the soil.

SUMMARY OF THE INVENTION

It is an object of the present invention to provide a dry, pre-mixed animal repellant that can be easily mixed into the soil around a desired object or plant, or around a rodent's tunnel or air opening.

It is another object of the present invention to provide such a repellant that does not injury the animal or destroy the object or animal.

It is another object of the present invention to provide such a repellant that also promotes growth of earthworms to allow quick growth of the plants.

These and other objects of the present invention are met by a pre-mixed animal gopher repellant that includes powdered blood meal mixed with chili powder. In the first embodiment, designed to repel dogs and cats, the concentration of blood meal to chili powder is 60%/40% (w/w). In the second embodiment designed specifically for moles and gophers, the concentration of blood meal and chili powder is 80%/201% (w/w), respectively. The specific concentration 80%/20% (w/w) for use with moles and gopher is important so that an adequate amount of blood meal and chili is supplied to the soil to promote plant growth and still repel the rodent. A specific concentration of chili powder made of peppers with a heat rating between 85,000 to 90,000 Scoville units also needed to sufficiently irritate the rodent's mucous membranes and produce an unattractive odor when mixed into the soil. A relatively high concentration of blood meal and chili powder is also desirable because they are absorbed into worms and grubs living in the soil which moles or gophers consume and find distasteful.

Both the blood meal and chili powder must remain in powder or granular form so that they can be easily mixed and dispersed into the soil. In the preferred embodiment, the blood meal and chili powder are uniformly mixed together in a moisture resistant container that may also be used as a dispenser. The container may be made of plastic or glass with a wide opening covered by a removable lid. In the preferred embodiment, the lid when closed creates a moisture tight seal. In the preferred embodiment, the blood meal has a moisture content of 10% or less thereby reducing hardening, clumping and mold growth.

When used properly, the repellant causes the dogs and cats to urinate on other objects and plants. The repellant also causes rodents to leave the existing tunnel system without killing the rodent or other animals and promotes the growth of damaged plants.

DESCRIPTION OF THE DRAWINGS

FIG. 1 is a perspective view of a user dispensing the pre-mixed repellant made of blood meal and chili powder from a moisture resistant container into a tunnel opening.

DESCRIPTION OF THE PREFERRED EMBODIMENT(S)

There is shown and described in the accompanying FIGURE an animal repellant 10 comprising powdered blood meal 30 mixed with either chili powder 40. The composition 10 is pre-mixed and distributed in 1 to 2 gallon moisture resistant container 12 with a large spout opening 14 and a handle 15. A lid 13 is provided to selectively close and seal the spout opening 14. During use, the composition 10 is dispensed from the container 12 while holding the handle 15 sprinkling the composition 10 over the top surface of soil or object to be protected or thoroughly mixed into the soil 50 and around a rodent's hole 52. During use, the animal smells the blood meal 20 and chili powder 40 when urinating or when digging in the tunnel.

The particle size and specific concentration of blood meal 30 and chili powder 40 is important in order for the composition 10 to be used as a repellant for dogs and cats and rodents. In the first embodiment, the composition 10 is used as a dog and cat is a 60%/40% (w/w) mixture of blood meal 30 and chili powder 40.

In the second embodiment, the composition 10 is used as a mole and gopher repellant containing 80%/20% (w/w) concentration of blood meal 30 and chili powder 40. Like the first embodiment, both ingredients 30, and 40 are moderately coarse to fine powders that also dissolve slowly when mixed into the soil. Gradually, the blood meal 30 and chili powder 40 are absorbed into or adhere to the outer surfaces of worms and grubs living in the soil. When this occurs, the worms and grubs become distasteful to rodents which causes them to leave the existing tunnel system and find new soil.

It is important that both the blood meal 30 and chili powder 40 must remain in dry powder or granular form when stored in the container 12 so that they can be easily mixed and dispersed into the soil when needed. In the preferred embodiment, the blood meal 30 and chili powder 40 are uniformly mixed together in the moisture resistant container 12 The container 12 may be made of plastic or glass with a wide opening covered by a removable lid 13. In the preferred embodiment, the lid 13 when closed over the opening 14 to create a moisture tight seal. In the preferred embodiment, the blood meal 30 has a moisture content of 10% or less thereby reducing hardening, clumping and mold growth.

In the preferred embodiment, the chili powder 40 must be made of peppers having a heat rating of at least 85,000 Scoville units or greater. Ideally, the types of chili peppers with this rating include some cayenne, habenero or scotch bonnet peppers.

An important aspect of the invention is that because blood meal 30 and chili powder 40 are not poisons to dogs, cats, and rodents.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A method for repelling both moles and gophers, comprising:
   a. selecting a mole or gopher tunnel opening in the ground;
   b. mixing a dry rodent repellant into a moisture resistant container with a spout opening, said repellant consisting of approximately 80% (w/w) dried blood meal mixed and approximately 20% (w/w) chili powder, said blood meal having a moisture content of 10% or less, said chili powder being made from peppers having a heat rating of 85,000 Scoville units or greater;
   c. positioning and tilting said container so that said repellent falls from said container;
   d. sprinkling said repellent from said spout opening and over or around said tunnel opening; and,
   e. mixing said repellent into the soil around said tunnel opening.

2. An animal repellant product, comprising:
   a. a resealable, moisture resistant container with a spout opening formed on one end; and,
   b. a two part granular repellant composition placed inside said moisture resistant container, said repellent consisting of approximately 80% (w/w), dried blood meal with a moisture content of 10% or less; and approximately 20% (w/w) chili powder, said chili powder made from peppers with a heat rating of 85,000 Scoville units or greater, said blood meal and said chili powder being uniformly mixed together to form said repellent.

3. The animal repellent product as recited in claim 2, wherein said container is rigid and made of glass or plastic and includes a lid that forms a moisture tight seal on said container.

4. The animal repellent product as recited in claim 3, further including a handle attached to said container.

\* \* \* \* \*